(12) United States Patent
Ji et al.

(10) Patent No.: US 10,805,186 B2
(45) Date of Patent: Oct. 13, 2020

(54) MOBILE COMMUNICATION NETWORK FAILURE MONITORING SYSTEM AND METHOD

(71) Applicant: KT Corporation, Seongnam-si, Gyeonggi-do (KR)

(72) Inventors: Hyun-Wook Ji, Seoul (KR); Hyo-Jung Kim, Seongnam-si (KR); Jung-Hoon Lee, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 16/288,369

(22) Filed: Feb. 28, 2019

(65) Prior Publication Data
US 2019/0199603 A1 Jun. 27, 2019

Related U.S. Application Data (63) Continuation of application No. PCT/KR2017/009379, filed on Aug. 28, 2017.

(30) Foreign Application Priority Data

Aug. 30, 2016 (KR) .......................... 10-2016-0110887

(51) Int. Cl.
*H04L 12/26* (2006.01)
*H04L 12/24* (2006.01)
(Continued)

(52) U.S. Cl.
CPC .......... *H04L 43/04* (2013.01); *H04L 41/0631* (2013.01); *H04L 41/0686* (2013.01);
(Continued)

(58) Field of Classification Search
CPC .. H04W 24/04; H04W 24/08; H04L 41/0631; H04L 41/0686; H04L 41/16; H04L 43/04;
(Continued)

(56) References Cited

U.S. PATENT DOCUMENTS

2002/0119771 A1* 8/2002 Boehmke ............... H04W 24/00
455/423
2006/0040711 A1* 2/2006 Whistler ............... H04W 24/00
455/566

(Continued)

FOREIGN PATENT DOCUMENTS

JP 2001-036484 A 2/2001
KR 2002-0045330 A 6/2002
(Continued)

OTHER PUBLICATIONS

International Search Report for PCT/KR2017/009379 dated Nov. 23, 2017 [PCT/ISA/210].

*Primary Examiner* — Steven H Nguyen
(74) *Attorney, Agent, or Firm* — Sughrue Mion, PLLC (57) ABSTRACT

Disclosed is mobile communication network failure monitoring system including: section-specific index value collecting unit for collecting a quantified index value about predetermined index which indicates communication situation of each corresponding communication section between nodes included in mobile communication network; index value pattern detecting unit for detecting index value pattern of mobile communication network by using index values collected according to each of communication sections; index value pattern learning unit for storing index value pattern of mobile communication network detected when failure of mobile communication network occurs, and corresponding failure cause, and then learning index value pattern of each failure cause of the mobile communication network; and failure information providing unit which compares index value pattern of mobile communication network detected during predetermined failure monitoring time and learned index value pattern, and then provides information
(Continued)

on whether failure occurs in mobile communication network and information on failure cause.

21 Claims, 6 Drawing Sheets

(51) Int. Cl.
 *H04W 24/04* (2009.01)
 *H04W 24/08* (2009.01)
(52) U.S. Cl.
 CPC .......... *H04L 41/16* (2013.01); *H04L 43/0811* (2013.01); *H04L 43/0817* (2013.01); *H04L 43/0882* (2013.01); *H04L 43/16* (2013.01); *H04W 24/04* (2013.01); *H04W 24/08* (2013.01)
(58) Field of Classification Search
 CPC .. H04L 43/0817; H04L 43/0882; H04L 43/16
 See application file for complete search history.

(56) References Cited

U.S. PATENT DOCUMENTS

| | | | |
|---|---|---|---|
| 2009/0063674 | A1 | 3/2009 | Brillhart et al. |
| 2015/0138989 | A1* | 5/2015 | Polehn ................. H04W 24/02 370/241 |
| 2016/0134747 | A1* | 5/2016 | Zhu ....................... H04W 24/00 455/425 |
| 2017/0116059 | A1* | 4/2017 | Wolf ..................... G06F 11/079 |

FOREIGN PATENT DOCUMENTS

| | | |
|---|---|---|
| KR | 10-2006-0062156 A | 6/2006 |
| KR | 10-0861592 B1 | 10/2008 |
| KR | 10-1490316 B1 | 2/2015 |
| KR | 10-1623071 B1 | 5/2016 |

* cited by examiner

| No | Interface | KPIs | Definition | Quantification unit | Alarm information |
|---|---|---|---|---|---|
| 1 | S1 | Attach Attempt | Increase in S1 Call Type == Attach | Number | Increase/Decrease |
| 2 | S1 | Attach Fail | Increase in Attach Reject | | Increase |
| 3 | S1 | SRMO Attempt | Increase in S1 Call Type == SRMO | | Increase/Decrease |
| 4 | S1 | SRMO Fail | Increase in Service Reject | | Increase |
| 5 | S1 | AuC Attempt | Increase in Diameter Request | | Increase/Decrease |
| 6 | S1 | AuC Fail | Increase in Diameter Result Code =! 2xxx | | Increase |
| 7 | S1 | AuC Delay | Increase in Diameter Request ~ Answer Delay | Sec | Increase |
| 8 | S1 | HSS Attempt | Increase in Diameter Request | Number | Increase/Decrease |
| 9 | S1 | HSS Fail | Increase in Diameter Result Code =! 2xxx | | Increase |
| 10 | S1 | HSS Delay | Increase in Diameter Request ~ Answer Delay | Sec | Increase |
| 11 | S1 | EIR Attempt | Increase in Diameter Request | Number | Increase/Decrease |
| 12 | S1 | EIR Fail | Increase in Diameter Result Code =! 2xxx | | Increase |
| 13 | S1 | EIR Delay | Increase in Diameter Request ~ Answer Delay | Sec | Increase |
| 14 | S11 | SGW Timeout | Increase in not responding after S11 Request | | Increase |
| 15 | S11 | SGW Fail Cause | Increase in S11 GTP Cause 64 or higher | | Increase |
| 16 | S11 | SGW DBR | Increase in S11 Delete Bearer Request | | Increase/Decrease |
| 17 | S11 | SGW DSR | Increase in S11 Delete Session Request | | Increase/Decrease |
| 18 | S5 | PGW Timeout | Increase in not responding after S5 Request | Number | Increase |
| 19 | S5 | PGW Fail Cause | Increase in S5 GTP Cause 64 or higher | | Increase |
| 20 | S5 | PGW DBR | Increase in S5 Delete Bearer Request | | Increase/Decrease |
| 21 | S5 | PGW DSR | Increase in S5 Delete Session Request | | Increase/Decrease |
| 22 | Gx | PCRF Attempt | Increase in Diameter Request | | Increase/Decrease |
| 23 | Gx | PCRF Fail | Increase in Diameter Result Code =! 2xxx | | Increase |
| 24 | Gx | PCRF Delay | Increase in Diameter Request ~ Answer Delay | Sec | Increase |

| No | KPIs | Definition | Quantification unit | Alarm information | Remarks |
|---|---|---|---|---|---|
| 1 | Attempt | TCP: SYN<br>HTTP: GET/POST | Number | Increase/Decrease | 1% or more of the total |
| 2 | Fail | TCP: TCP Setup did not succeed and failed<br>HTTP: HTTP Response Code = 4xx, 5xx | Percent (%) | Increase | - |
| 3 | Traffic - Tx | Sum of Tx(Upload) Bytes | MB | Increase | 1% or more of the total |
| 4 | Traffic - Rx | Sum of Rx(Download) Bytes | MB | Increase | 1% or more of the total |
| 5 | RTT - Server | UE to Server Delay<br>(Time difference of TCP SYN ~ SYN/ACK) | Sec | Increase | - |

MOBILE COMMUNICATION NETWORK FAILURE MONITORING SYSTEM AND METHOD

CROSS-REFERENCE TO RELATED APPLICATIONS

This application is a Continuation Application of International Application PCT/KR2017/009379 filed on Aug. 28, 2017 which claims priority from Korean Patent Application No. 10-2016-0110887 filed on Aug. 30, 2016, in the Korean Intellectual Property Office, the disclosures of which are hereby incorporated herein in their entirety by reference.

BACKGROUND

1. Field

The present disclosure relates to a mobile communication network failure monitoring system and method, and more particularly, to a mobile communication network failure monitoring system and method for accurately and reliably detecting failures occurring by various causes in various sections of a mobile communication network.

2. Related Art

In general, a mobile communication network such as a Long Term Evolution (LTE) communication network is a wired/wireless network that enables communication between mobile communication terminals or between a mobile communication terminal and a predetermined server. Because various network devices are organically connected and linked to each other in the mobile communication network, when a failure cause occurs in a communication section, an abnormal communication situation may be detected in relevant communication sections.

However, as disclosed by Korean Patent No. 10-1490316 and Japanese Patent Publication No. 2001-036484, in determining whether failure occurred, existing techniques perform the operation only for a traffic abnormality detected section among many communication sections of a mobile communication network, and thus, when traffic abnormality occurs over the sections due to one failure, they cannot quickly detect the location at which the failure actually occurred and accurately analyze the cause of the corresponding failure. Additionally, when determining if failure occurred in the mobile communication network, the existing techniques do not consider a change in total amount of communication in the mobile communication network with the increasing number of mobile communication service subscribers or the increasing number of new services created by a large number of users such as Social Network Services (SNSs) or online game services, failing to adaptively deal with an environmental change of the mobile communication network.

SUMMARY

The present disclosure is directed to providing a mobile communication network failure monitoring system and method that detects failures occurring by various causes in various sections of a mobile communication network accurately and reliably based on knowledge, and provides a failure occurrence fact and even failure cause information in real time.

A mobile communication network failure monitoring system according to an embodiment of the present disclosure may include a per section indicator value collection unit which collects a quantified indicator value about a predetermined indicator indicating a communication situation of a corresponding communication section for each communication section between each node that constitutes a mobile communication network, an indicator value pattern detection unit which detects an indicator value pattern of the mobile communication network using the indicator value collected for each communication section, an indicator value pattern learning unit which learns the indicator value pattern for each failure cause of the mobile communication network by storing the indicator value pattern of the mobile communication network detected when a failure occurs in the mobile communication network and a corresponding failure cause, and a failure information providing unit which provides information about whether a failure occurred in the mobile communication network and a failure cause by comparing the indicator value pattern of the mobile communication network detected for a predetermined failure monitoring time with the learned indicator value pattern.

In an embodiment, the per section indicator value collection unit may collect a signaling indicator value about predetermined signaling occurring in a corresponding communication section or a traffic indicator value about traffic occurring in the corresponding communication section.

In an embodiment, the per section indicator value collection unit may include an indicator setting unit which sets an indicator indicating a communication situation of a corresponding communication section for each communication section, an indicator information receiving unit which receives indicator information about the indicator for each communication section, and an indicator value calculation unit which calculates an indicator value quantitatively indicating the communication situation of the corresponding communication section using the indicator information.

In an embodiment, the indicator value pattern detection unit may include a threshold value calculation unit which calculates a threshold value indicating an abnormal indicator value range of the corresponding indicator using the indicator values of each indicator collected repeatedly for a predetermined period of time, an abnormal indicator value detection unit which detects an abnormal indicator value for each communication section by comparing the indicator value of each indicator collected for a predetermined failure monitoring time with the threshold value of the corresponding indicator, and an indicator value pattern information generation unit which generates indicator value pattern information of the mobile communication network using the abnormal indicator value detected for each communication section.

In an embodiment, the threshold value calculation unit may calculate a plurality of threshold values indicating the abnormal indicator value range and an abnormal level of an indicator value corresponding to the abnormal indicator value range.

In an embodiment, the abnormal indicator value detection unit may detect the abnormal indicator value and the abnormal level of the abnormal indicator value for each communication section by comparing the indicator value of each indicator collected for the predetermined failure monitoring time with the plurality of threshold values.

In an embodiment, the indicator value pattern information generation unit may generate indicator value pattern information of the mobile communication network using the abnormal indicator value detected for each communication section and the abnormal level of the abnormal indicator value.

In an embodiment, the indicator value pattern detection unit may further include an alarm information generation unit to generate alarm information about the abnormal indicator value detected for each communication section and output the same through a predetermined output unit.

In an embodiment, the indicator value pattern learning unit may match the indicator value pattern of the mobile communication network including the abnormal indicator value collected for each communication section when a failure occurs in the mobile communication network with a failure cause inputted through a predetermined input unit and store the same.

In an embodiment, the failure information providing unit may include a failure occurrence detection unit which compares the indicator value pattern of the mobile communication network detected for a predetermined failure monitoring time with the learned indicator value pattern, and when there is sameness, detects that a failure occurred in the mobile communication network, and a failure information generation unit which generates failure information including a corresponding failure occurrence fact and a failure cause corresponding to the indicator value pattern of the mobile communication network and outputs the same through the predetermined output unit, when it is detected that the failure occurred in the mobile communication network.

A mobile communication network failure monitoring method according to an embodiment of the present disclosure monitors a failure in a mobile communication network using a mobile communication network failure monitoring system, and may include the per section indicator value collection step of collecting, by the system, quantified indicator values about a predetermined indicator indicating a communication situation of a corresponding communication section for each communication section between each node that constitutes the mobile communication network, the indicator value pattern detection step of detecting, by the system, an indicator value pattern of the mobile communication network using the indicator value collected for each communication section, the indicator value pattern learning step of learning, by the system, the indicator value pattern for each failure cause of the mobile communication network by storing the indicator value pattern of the mobile communication network detected when a failure occurs in the mobile communication network and a corresponding failure cause, and the failure information providing step of providing, by the system, information about whether a failure occurred in the mobile communication network and a failure cause by comparing the indicator value pattern of the mobile communication network detected for a predetermined failure monitoring time with the learned indicator value pattern.

In an embodiment, the per section indicator value collection step may include collecting a signaling indicator value about predetermined signaling occurring in a corresponding communication section or a traffic indicator value about traffic occurring in the corresponding communication section.

In an embodiment, the per section indicator value collection step may include the indicator setting step of setting, by the system, an indicator indicating a communication situation of a corresponding communication section for each communication section, the indicator information receiving step of receiving, by the system, indicator information about the indicator for each communication section, and the indicator value calculation step of calculating, by the system, an indicator value quantitatively indicating the communication situation of the corresponding communication section using the indicator information.

In an embodiment, the indicator value pattern detection step may include the threshold value calculation step of calculating, by the system, a threshold value indicating an abnormal indicator value range of the corresponding indicator using the indicator values of each indicator collected repeatedly for a predetermined period of time, the abnormal indicator value detection step of detecting, by the system, an abnormal indicator value for each communication section by comparing the indicator value of each indicator collected for a predetermined failure monitoring time with the threshold value of the corresponding indicator, and the indicator value pattern information generation step of generating, by the system, indicator value pattern information of the mobile communication network using the abnormal indicator value detected for each communication section.

In an embodiment, the threshold value calculation step may include calculating a plurality of threshold values indicating the abnormal indicator value range and an abnormal level of an indicator value corresponding to the abnormal indicator value range.

In an embodiment, the abnormal indicator value detection step may include detecting the abnormal indicator value and the abnormal level of the abnormal indicator value for each communication section by comparing the indicator value of each indicator collected for the predetermined failure monitoring time with the plurality of threshold values.

In an embodiment, the indicator value pattern information generation step may include generating indicator value pattern information of the mobile communication network using the abnormal indicator value detected for each communication section and the abnormal level of the abnormal indicator value.

In an embodiment, the indicator value pattern detection step may further include generating, by the system, alarm information about the abnormal indicator value detected for each communication section and outputting the same through a predetermined output unit of the system.

In an embodiment, the indicator value pattern learning step may include matching, by the system, the indicator value pattern of the mobile communication network including the abnormal indicator value collected for each communication section when a failure occurs in the mobile communication network with a failure cause inputted through a predetermined input unit of the system and storing the same.

In an embodiment, the failure information providing step may include the failure occurrence detection step of comparing, by the system, the indicator value pattern of the mobile communication network detected for a predetermined failure monitoring time with the learned indicator value pattern, and when there is sameness, detecting that a failure occurred in the mobile communication network, and the failure information generation step of generating, by the system, failure information including a corresponding failure occurrence fact and a failure cause corresponding to the indicator value pattern of the mobile communication network and outputting the same through the predetermined output unit of the system, when it is detected that the failure occurred in the mobile communication network.

The embodiments according to the present disclosure may be implemented in a computer program for performing the above-described operations or steps in a computer system, recorded on a computer-readable recording medium.

According to the present disclosure, in a mobile communication network including section between a mobile communication terminal and a server, indicator values indicating the communication situation of the corresponding section are collected from many communication sections between each device that constitutes the mobile communication network to monitor the overall communication situation of the mobile communication network, thereby accurately and reliably detecting failures occurring by various causes in various sections of the mobile communication network in which many devices are organically connected and linked to each other.

Additionally, considering all indicator values collected from many communication sections of the mobile communication network as an indicator value pattern indicating the communication situation of the mobile communication network, an indicator value pattern when failure occurs is learned to provide the failure occurrence fact and failure cause information in real time when the same indicator value pattern appears in the mobile communication network later, thereby eliminating the failure quickly and guaranteeing the quality of a communication service.

Furthermore, before failure monitoring, a threshold value for identifying if each indicator value is abnormal is calculated by applying a statistical method to indicator values collected for a predetermined period of time, and the indicator value pattern of the mobile communication network is detected or learned based on the threshold values, thereby responding to a gradual environmental change of the mobile communication network such as a change in the total amount of communication.

Moreover, the threshold value identifies if the indicator values are abnormal as well as how much abnormal the indicator value is, and the indicator value pattern of the mobile communication network is detected or learned based on the threshold values, resulting in further improved accuracy and reliability in failure detection and analysis.

Further, it will be apparent from the following description that the embodiments according to the present disclosure can solve these and other technical problems, as can be understood by those having ordinary skill in the technical field pertaining to the present disclosure.

BRIEF DESCRIPTION OF THE DRAWINGS

FIG. 4 is a table showing an example of signaling indicators indicating the communication situation of a mobile communication network.

DETAILED DESCRIPTION OF EXEMPLARY EMBODIMENTS

Hereinafter, the embodiments of the present disclosure will be described in detail with reference to the accompanying drawings to particularly describe the solutions to the technical problems of the present disclosure. However, in describing the present disclosure, when a description of relevant known technology renders the key subject matter of the present disclosure ambiguous, the description is omitted herein. Additionally, definition of terms used herein are made, taking the functions in the present disclosure into account, and may be subject to change depending on the intention of the designer and manufacturer or the convention. Therefore, the definition should be made based on the content throughout the specification.

Figure 1:
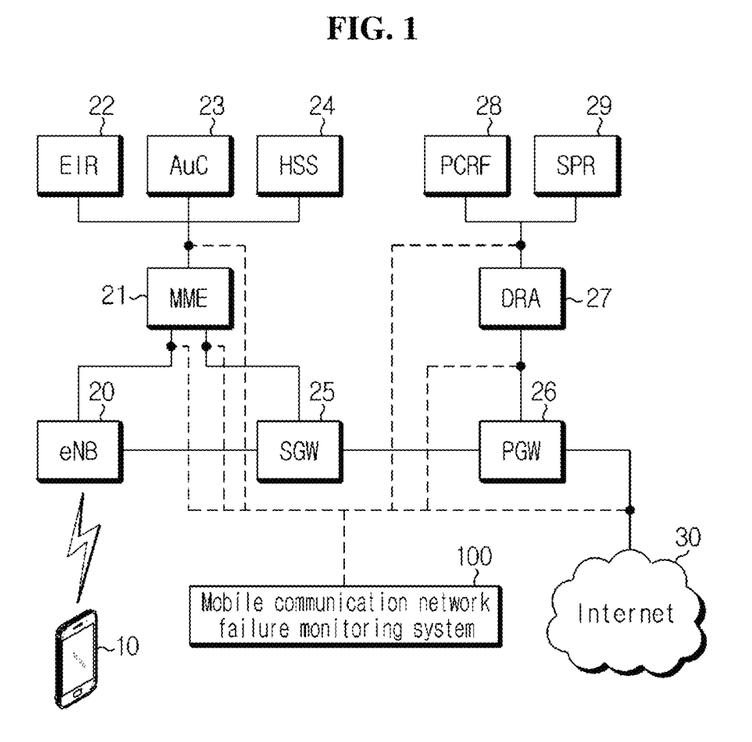
FIG. 1 is a diagram showing an example of a mobile communication network environment to which the present disclosure is applied.

FIG. 1 is a diagram showing an example of a mobile communication network environment to which the present disclosure is applied.

As shown in FIG. 1, a mobile communication network such as a Long Term Evolution (LTE) communication network includes a plurality of core network devices organically connected and linked to each other via a wired•wireless network. For example, in the case of an LTE communication network, when a user powers on a mobile communication terminal 10 such as a smartphone, the corresponding terminal 10 requests location registration to an Evolved Packet Core (EPC) network through a base station 20. Then, a Mobility Management Entity (MME) 21 that manages mobility of mobile communication terminals is linked to an Equipment Identity Register (EIR) 22 to perform terminal authentication, an Authentication Center (AuC) 23 to perform subscriber authentication, and a Home Subscriber Server (HSS) 24 to perform location registration of the corresponding terminal. Meanwhile, a Serving Gateway (SGW) 25 is linked to a Packet data network Gateway (PGW) 26 to generate a data session, and the PGW 26 is linked to a Policy and Charging Rules Function (PCRF) 28 and a Subscriber Profile Repository (SPR) 29 to apply a policy and manage Quality of Service (QoS). In this instance, a Diameter Routing Agent (DRA) 27 is responsible for Diameter message routing. After this process is performed, the user can connect to a wireless Internet 30 through the mobile communication terminal 10.

As such, because various network devices are organically connected and linked to each other in the mobile communication network, when a failure cause occurs in any one of communication sections between the network devices, an abnormal communication situation may be detected in many related communication sections.

The mobile communication network failure monitoring system 100 according to the present disclosure may be implemented as a computer system that makes communication via a wired•wireless network such as a server or a computer, and may be applied to the above-described mobile communication network to detect failures occurring by various causes in various sections of the mobile communication network accurately and reliably based on knowledge.

Figure 2:
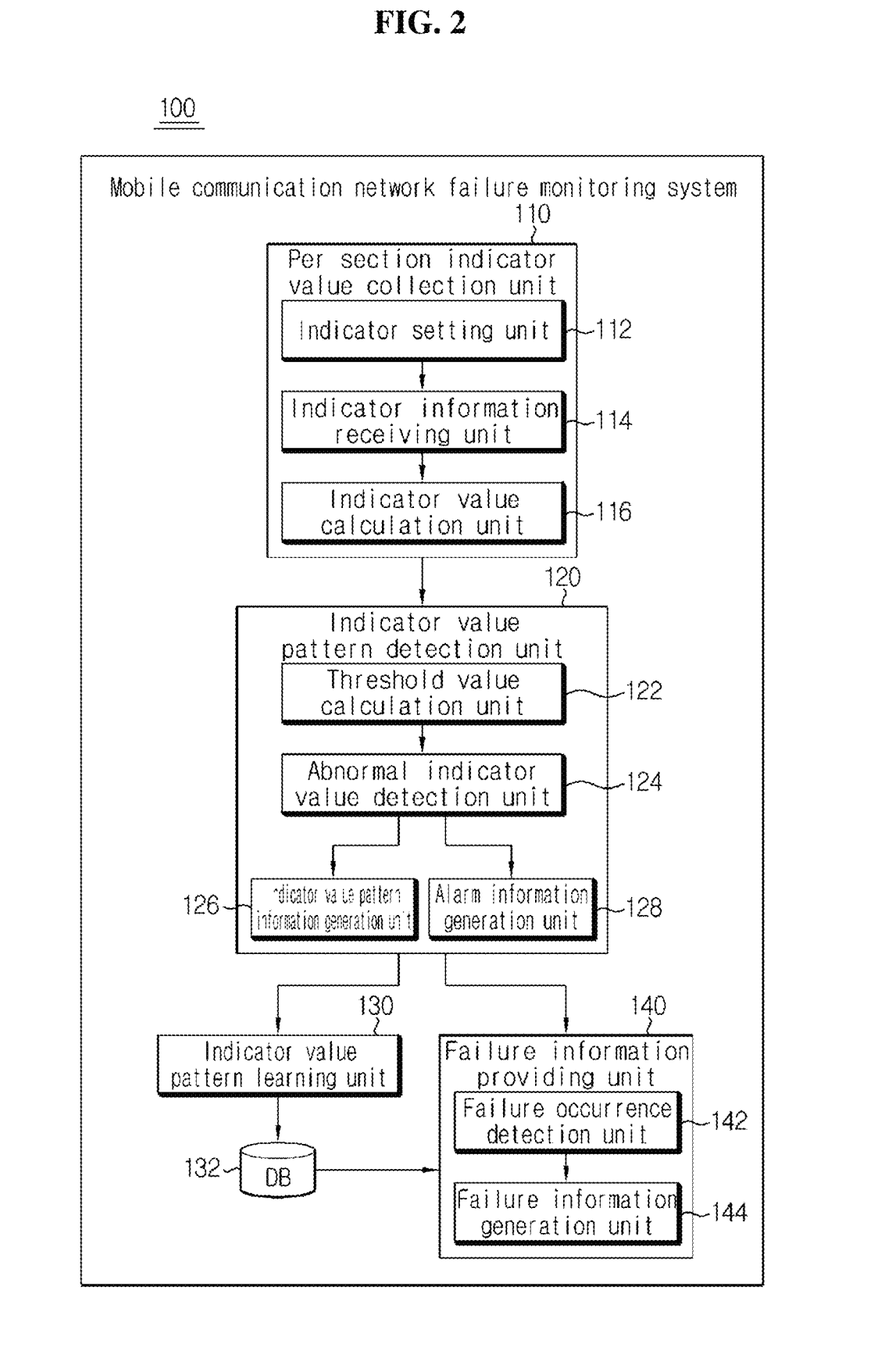
FIG. 2 is a block diagram showing a mobile communication network failure monitoring system according to an embodiment of the present disclosure.

FIG. 2 is a block diagram showing the mobile communication network failure monitoring system 100 according to an embodiment of the present disclosure.

As shown in FIG. 2, the mobile communication network failure monitoring system 100 may include a per section indicator value collection unit 110, an indicator value pattern detection unit 120, an indicator value pattern learning unit 130 and a failure information providing unit 140, each of which or a combination thereof may be implemented in as hardware, controller, or processor.

The per section indicator value collection unit 110 of the system 100 may collect a quantified indicator value about a predetermined indicator indicating the communication situation of the corresponding communication section for each communication section between each node that constitutes the mobile communication network. In this case, the per section indicator value collection unit 110 may collect a signaling indicator value about predetermined signaling occurring in the corresponding communication section or a traffic indicator value about traffic occurring in the corresponding communication section. Additionally, the communication section in which the per section indicator value collection unit 110 collects the indicator value may include traffic section between the mobile communication terminal and various types of servers. To this end, the per section indicator value collection unit 110 may include an indicator setting unit 112, an indicator information receiving unit 114 and an indicator value calculation unit 116, each of which or a combination thereof may be implemented in as hardware, controller, or processor.

In this case, the indicator setting unit 112 may set an indicator indicating the communication situation of the corresponding communication section for each communication section of the mobile communication network. In this instance, the indicator setting unit 112 may set different indicators for each communication section. For example, with regard to communication section between the MME 21 and the HSS 24, the indicator setting unit 112 may set information about signaling occurring in the corresponding section as an indicator of the corresponding section, and with regard to traffic section between the mobile communication terminal and the server, may set information about traffic of the corresponding section as an indicator as the corresponding section. These indicators may be set or changed according to an input from a system operator.

The indicator information receiving unit 114 may receive indicator information about the indicator set for each communication section. In this case, the indicator information receiving unit 114 may collect signaling indicator information or traffic indicator information transmitted and received in the corresponding section by tapping a physical interface link of the corresponding communication section or mirroring signaling and traffic at a network device such as a switch that connects two devices. Additionally, the signaling indicator information received by the indicator information receiving unit 114 may be information indicating signaling about a predetermined attempt, failure and delay occurring in the corresponding section, and the traffic indicator information received by the indicator information receiving unit 114 may be information indicating an amount of transmission and reception traffic and delay of the corresponding section.

The indicator value calculation unit 116 may calculate an indicator value quantitatively indicating the communication situation of the corresponding communication section using the received indicator information. In this case, the indicator value calculation unit 116 may calculate a signaling indicator value about a signaling indicator occurring in the corresponding communication section or a traffic indicator value about traffic occurring in the corresponding communication section.

The indicator value pattern detection unit 120 of the system 100 may detect an indicator value pattern of the entire mobile communication network using the indicator values collected for each communication section of the mobile communication network. To this end, the indicator value pattern detection unit 120 may include a threshold value calculation unit 122, an abnormal indicator value detection unit 124 and an indicator value pattern information generation unit 126, and may further include an alarm information generation unit 128, each of which or a combination thereof may be implemented in as hardware, controller, or processor.

In this case, the threshold value calculation unit 122 may calculate a threshold value indicating an abnormal indicator value range of the corresponding indicator using the indicator values of each indicator repeatedly collected for a predetermined period of time beforehand. For example, the threshold value calculation unit 122 may calculate a maximum value, a minimum value and an average value, and a standard deviation of the indicator values by applying a statistical method to an indicator value population repeatedly collected for a predetermined period of time, and calculate a value of the top or bottom x % on the standard normal distribution of the indicator value population using the threshold value. In this instance, the threshold value calculation unit 122 may calculate the threshold value by selecting indicator values collected on the same day and time as a failure monitoring time of the system 100 in the indicator value population as an effective value. Additionally, the threshold value calculation unit 122 may select indicator values except predetermined specific values in the indicator value population as an effective value. Although described below, the failure information providing unit 140 as described below may set indicator values when a failure is determined to have occurred as a specific value to be excluded from the indicator value population when calculating the threshold value later and store it in a separate file, and the threshold value calculation unit 122 may refer to the corresponding file when calculating the threshold value later. Meanwhile, according to an embodiment, in addition to the abnormal indicator value range, the threshold value calculation unit 122 may calculate a plurality of threshold values indicating an abnormal level of an indicator value corresponding to the abnormal indicator value range. For example, the threshold value calculation unit 122 may classify the abnormal indicator value range into three ranges according to the system operating policy, and calculate a first threshold value indicating a low abnormal level, a second threshold value indicating a moderate abnormal level, and a third threshold value indicating a high abnormal level. Additionally, the threshold value calculation unit 122 may calculate a plurality of threshold values by setting a reference value for threshold value calculation, and adding or subtracting a predetermined correction value to/from the reference value. For example, the threshold value calculation unit 122 may calculate a plurality of threshold values as shown in the following Equations 1, 2 and 3.

$$X_1 = X_0 + a \cdot \sigma \qquad \text{[Equation 1]}$$

Here, X1 denotes the first threshold value, X0 denotes the reference value (the specific value on the standard normal distribution, for example, the value corresponding to the top•bottom 5%), σ denotes the standard deviation of the population, and a denotes the correction coefficient.

$$X_2 = X_0 + b(I_{max} - I_m) \qquad \text{[Equation 2]}$$

Here, X2 denotes the second threshold value, X0 denotes the reference value (the specific value on the standard normal distribution, for example, the value corresponding to the top•bottom 5%), Imax denotes the maximum value of the population, Im denotes the average value of the population, and b denotes the correction coefficient.

$$X_3 = X_0 + c(I_{max} - I_{min}) \qquad \text{[Equation 3]}$$

Here, X3 denotes the third threshold value, X0 denotes the reference value (the specific value on the standard normal distribution, for example, the value corresponding to the top·bottom 5%), Imax denotes the maximum value of the population, Imin denotes the average value of the population, and c denotes the correction coefficient.

The plurality of calculated threshold values may indicate the abnormal level of the indicator value. For example, the first threshold value may indicate minor, the second threshold value may indicate major, and the third threshold value may indicate critical.

The abnormal indicator value detection unit 124 may detect an abnormal indicator value for each communication section by comparing the indicator value of each indicator collected for the predetermined failure monitoring time of the system 100 with the threshold value of the corresponding indicator. In this case, the abnormal indicator value detection unit 124 may detect the abnormal indicator value and the abnormal level of the abnormal indicator value for each communication section by comparing the indicator value of each indicator collected for the failure monitoring time with the plurality of threshold values.

The indicator value pattern information generation unit 126 may generate indicator value pattern information of the mobile communication network using the abnormal indicator value detected for each communication section. When the abnormal indicator value detection unit 124 detects the abnormal indicator value for each communication section and the abnormal level of the abnormal indicator value, the indicator value pattern information generation unit 126 may generate indicator value pattern information of the mobile communication network using the abnormal indicator value detected for each communication section and the abnormal level of the abnormal indicator value.

Meanwhile, the alarm information generation unit 128 may generate alarm information about the abnormal indicator value detected for each communication section and output it through a predetermined output unit (not shown) of the system 100 such as a display device, an audio device or a printer. In this case, the alarm information generated by the alarm information generation unit 128 may be information indicating that a current indicator value of a particular communication section increased or decreased, or information indicating that the abnormal level of the current indicator value corresponds to any one of minor, major and critical levels.

The indicator value pattern learning unit 130 of the system 100 may learn an indicator value pattern for each failure cause of the mobile communication network by storing the indicator value pattern of the mobile communication network detected when failure occurs in the mobile communication network and the corresponding failure cause. For example, the indicator value pattern learning unit 130 may match the indicator value pattern of the mobile communication network including the abnormal indicator value collected for each communication section when failure occurs in the mobile communication network with the failure cause inputted through an input unit (not shown) of the system 100 such as a keyboard, a mouse or a touch panel, and store it in a database 132. In this instance, the indicator value pattern learning unit 130 may match the indicator value pattern information automatically generated by the indicator value pattern detection unit 120 when failure occurs with the corresponding failure cause information and store it in the database 132, and may match the indicator value pattern information manually combined by the system operator with the corresponding failure cause information and store it in the database 132.

The failure information providing unit 140 of the system 100 may provide information about whether failure occurred in the mobile communication network and the failure cause by comparing the indicator value pattern of the mobile communication network detected for the predetermined failure monitoring time of the system 100 with the learned indicator value pattern. To this end, the failure information providing unit 140 may include a failure occurrence detection unit 142 and a failure information generation unit 144, each of which or a combination thereof may be implemented in as hardware, controller, or processor.

In this case, the failure occurrence detection unit 142 may compare the indicator value pattern of the mobile communication network detected for the predetermined failure monitoring time with the learned indicator value pattern, and when there is sameness, may detect that failure occurred in the mobile communication network. As mentioned above, when it is detected that failure occurred in the mobile communication network, the failure occurrence detection unit 142 may store the date of the corresponding failure occurred or the abnormal indicator values collected on the date of the corresponding failure occurred in a separate file of Exception.ini, to prevent it from being considered in the threshold value calculation process of the indicator value pattern detection unit 120 later.

When it is detected that failure occurred in the mobile communication network, the failure information generation unit 144 may search for failure cause information corresponding to the indicator value pattern of the mobile communication network in the database 132, generate failure information including the failure occurrence fact and the failure cause corresponding to the indicator value pattern of the mobile communication network, and output it through the predetermined output unit (not shown) of the system 100 such as a display device, an audio device or a printer.

Figure 3:
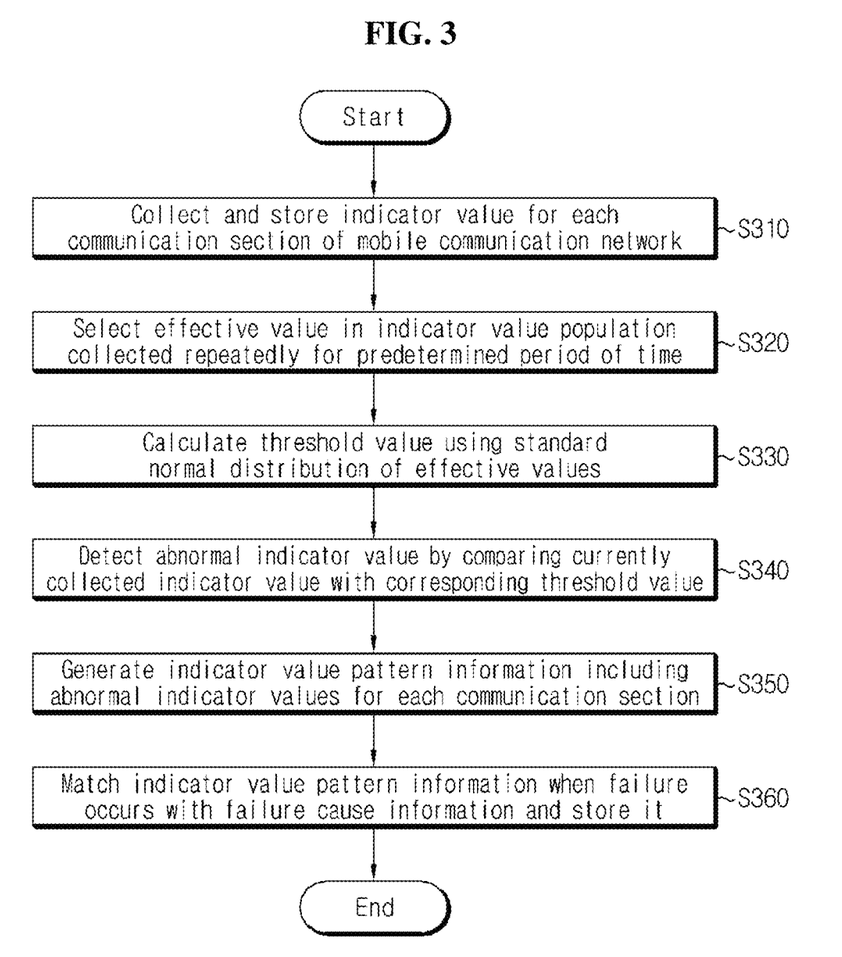
FIG. 3 is a flowchart showing a process of learning an indicator value pattern of a mobile communication network failure monitoring method according to an embodiment of the present disclosure.

FIG. 3 is a flowchart showing the process of learning an indicator value pattern of the mobile communication network failure monitoring method according to an embodiment of the present disclosure.

As shown in FIG. 3, the mobile communication network failure monitoring system 100 may learn an indicator value pattern for each failure cause of the mobile communication network beforehand.

First, the per section indicator value collection unit 110 of the system 100 may collect and store a quantified indicator value about a predetermined indicator indicating the communication situation of the corresponding communication section for each communication section between each node that constitutes the mobile communication network (S310). In this case, the indicator indicating the communication situation of the corresponding communication section may be a signaling indicator about signaling occurring in the corresponding communication section or a traffic indicator about traffic occurring in the corresponding communication section.

FIG. 4 is a table showing an example of signaling indicators indicating the communication situation of the mobile communication network.

As shown in FIG. 4, a unique interface is applied according to the LTE communication standard for each communication section between network devices that constitute the mobile communication network, and information related to unique signaling occurring in each communication section may be used as the signaling indicator indicating the communication situation of the corresponding communication section. The signaling indicators may be quantified in a suitable unit such as how many the corresponding signaling occurred or the time indicated by the corresponding signaling.

Figure 5:
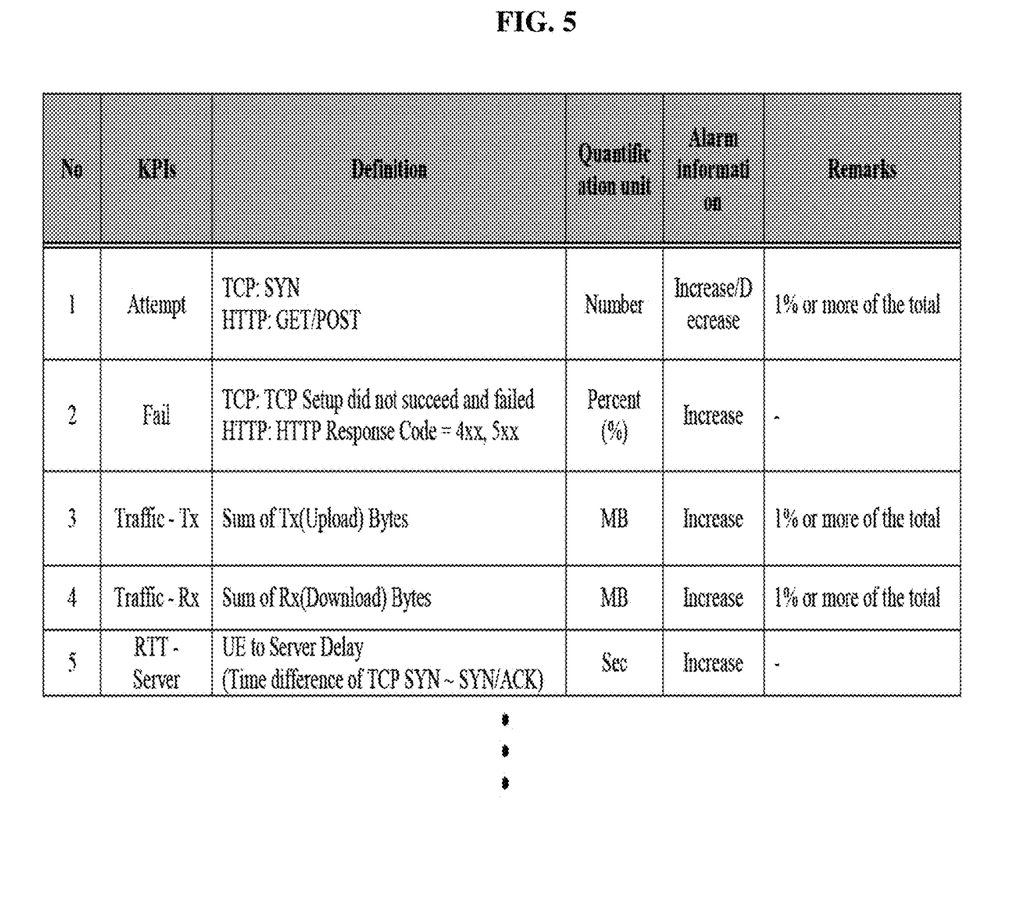
FIG. 5 is a table showing an example of traffic indicators indicating the communication situation of a mobile communication network.

FIG. 5 is a table showing an example of traffic indicators indicating the communication situation of the mobile communication network.

As shown in FIG. 5, in communication section in which traffic occurs such as section between the mobile communication terminal and the server among communication sections of the mobile communication network, traffic related information may be used as the traffic indicator indicating the communication situation of the corresponding communication section. The traffic indicators may be quantified in a suitable unit such as the number of attempts, failure percentage (%), an amount of transmission and reception traffic, and delay.

Referring back to FIG. 3, the indicator value pattern detection unit 120 of the system 100 may detect an indicator value pattern of the entire mobile communication network using the indicator values collected for each communication section of the mobile communication network (S320 to S350).

Describing in detail, the threshold value calculation unit 122 of the indicator value pattern detection unit 120 may calculate a threshold value by selecting indicator values collected on the same day and time as the failure monitoring time of the system 100 in the indicator value population of each indicator collected repeatedly for the predetermined period of time beforehand as an effective value (S320). For example, when the current failure monitoring time of the system 100 is from 12:00 a.m. to 1:00 a.m. Monday, the threshold value calculation unit 122 may calculate a threshold value by selecting indicator values collected from 12:00 a.m. to 1:00 a.m. every Monday among indicator values collected within one month from the corresponding failure monitoring time as an effective value. In this case, the threshold value calculation unit 122 may select indicator values except the abnormal indicator value collected previously when failure occurs in the indicator value population as the effective value. In this instance, the threshold value calculation unit 122 may refer to the Exception.ini file. Additionally, the threshold value calculation unit 122 may calculate the threshold value indicating an abnormal indicator value range of the corresponding indicator using the selected effective values (S330). In this case, the threshold value calculation unit 122 may calculate the threshold value using a value of the top or bottom x % on the standard normal distribution of the effective values. In this instance, the threshold value calculation unit 122 may calculate a plurality of threshold values indicating the abnormal level of indicator values corresponding to the abnormal indicator value range together with the abnormal indicator value range. For example, the threshold value calculation unit 122 may classify the abnormal indicator value range into three ranges according to the system operating policy, and calculate a first threshold value indicating a low abnormal level, a second threshold value indicating a moderate abnormal level, and a third threshold value indicating a high abnormal level. Additionally, the threshold value calculation unit 122 may calculate the plurality of threshold values by setting a reference value for threshold value calculation like Equations 1, 2 and 3, and adding or subtracting a predetermined correction value to/from the reference value.

Subsequently, the abnormal indicator value detection unit 124 of the indicator value pattern detection unit 120 may detect an abnormal indicator value for each communication section by comparing the currently collected indicator value of each indicator with the threshold value of the corresponding indicator (S340). In this case, the abnormal indicator value detection unit 124 may detect the abnormal indicator value and the abnormal level of the abnormal indicator value for each communication section by comparing the indicator value of each indicator collected for the failure monitoring time with the plurality of threshold values.

Subsequently, the indicator value pattern information generation unit 126 of the indicator value pattern detection unit 120 may generate indicator value pattern information including the abnormal indicator values detected for each communication section (S350). In this case, the indicator value pattern information may be a combination of the abnormal indicator values. Additionally, when the abnormal indicator value detection unit 124 of the indicator value pattern detection unit 120 detects the abnormal level of the abnormal indicator value together with the abnormal indicator value for each communication section, the indicator value pattern information generation unit 126 may generate indicator value pattern information indicating both the abnormal indicator value detected for each communication section and the abnormal level of the abnormal indicator value. For example, when the mobile communication network includes section A, section B and section C, the indicator value pattern information of the corresponding the mobile communication network may represent a critical pattern of section A, a minor pattern of section B and a major pattern of section C.

Subsequently, the indicator value pattern learning unit 130 of the system 100 may learn an indicator value pattern for each failure cause of the mobile communication network by matching the indicator value pattern information of the mobile communication network generated when failure occurs in the mobile communication network with the corresponding failure cause and storing it (S360). In this case, the indicator value pattern learning unit 130 may match the indicator value pattern of the mobile communication network including the abnormal indicator value collected for each communication section when failure occurs in the mobile communication network with the failure cause inputted through the predetermined input unit (not shown) of the system 100 such as a keyboard, a mouse or a touch panel, and store it in the database 132. According to an embodiment, the indicator value pattern learning unit 130 may match the indicator value pattern information manually combined by the system operator with the corresponding failure cause information and store it in the database 132.

Figure 6:
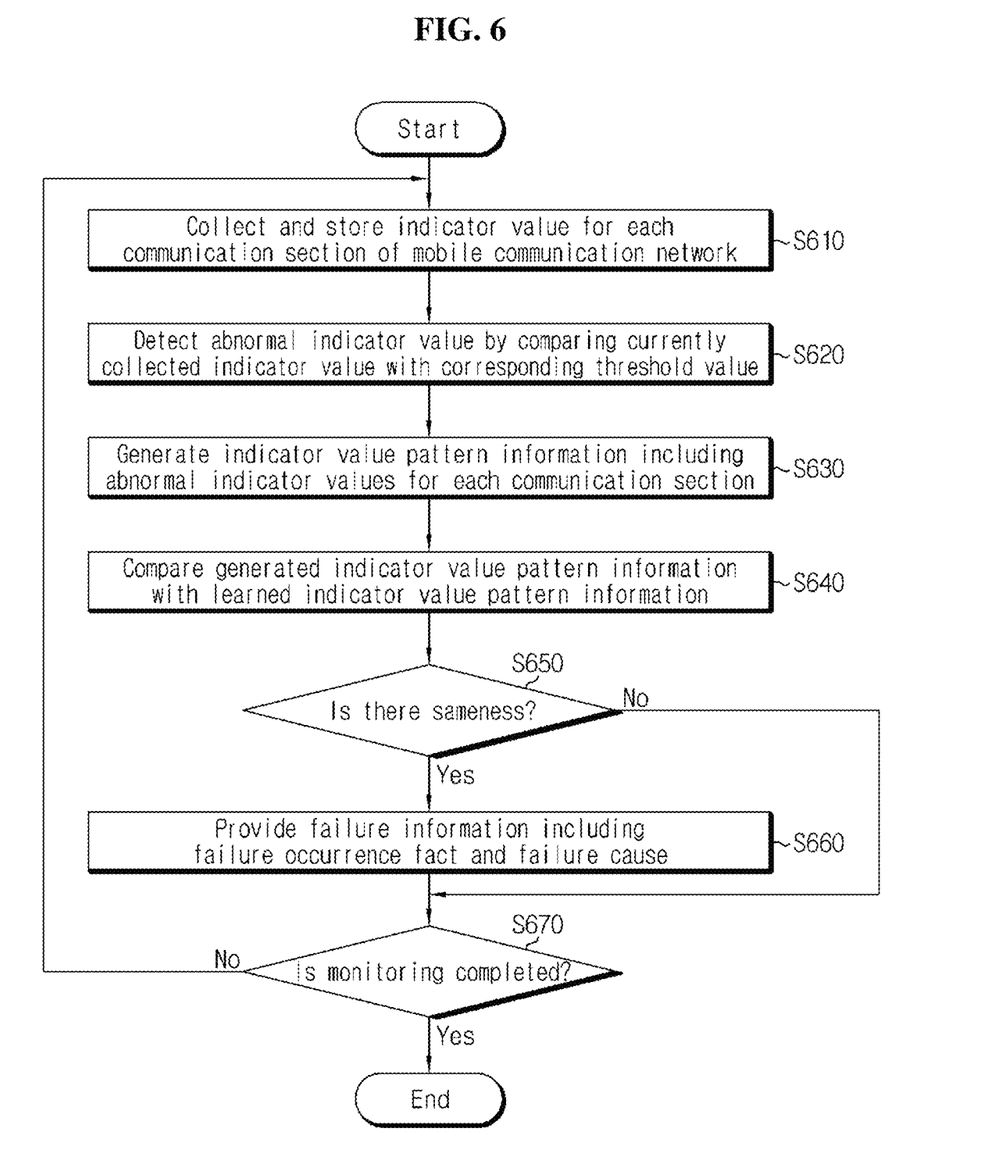
FIG. 6 is a flowchart showing a process of providing failure information of a mobile communication network failure monitoring method according to an embodiment of the present disclosure.

FIG. 6 is a flowchart showing the process of providing failure information of the mobile communication network failure monitoring method according to an embodiment of the present disclosure.

As shown in FIG. 6, the mobile communication network failure monitoring system 100 having gone through the indicator value pattern learning process for each failure cause of the mobile communication network may detect failures occurring by various causes in various sections of the mobile communication network based on knowledge and provide information about the corresponding failure occurrence fact and the failure cause in real time.

First, the per section indicator value collection unit 110 of the system 100 may collect and store indicator values indicating the current communication situation of the corresponding communication section for each communication section of the mobile communication network (S610).

Subsequently, the indicator value pattern detection unit 120 of the system 100 may detect a current indicator value pattern of the mobile communication network using the indicator values collected for each communication section of the mobile communication network (S620, S630).

Describing in detail, the abnormal indicator value detection unit 124 of the indicator value pattern detection unit 120 may detect an abnormal indicator value for each communication section by comparing the currently collected indicator value of each indicator with the threshold value of the corresponding indicator (S620). In this case, the abnormal indicator value detection unit 124 may detect the abnormal indicator value and the abnormal level of the abnormal indicator value for each communication section by comparing the currently collected indicator value of each indicator with the plurality of threshold values. Meanwhile, the alarm information generation unit 128 of the indicator value pattern detection unit 120 may generate alarm information about the abnormal indicator value detected for each communication section, and output the corresponding alarm information through the predetermined output unit (not shown) of the system 100 such as a display device, an audio device or a printer. In this case, as shown in FIG. 4 or 5, the alarm information generated by the alarm information generation unit 128 may be information indicating that the current indicator value of the corresponding communication section increased or decreased, or information indicating that the abnormal level of the current indicator value corresponds to any one of minor, major and critical levels.

Subsequently, the indicator value pattern information generation unit 126 of the indicator value pattern detection unit 120 may generate indicator value pattern information including the abnormal indicator values detected for each communication section (S630). Meanwhile, when the abnormal indicator value detection unit 124 of the indicator value pattern detection unit 120 detects the abnormal level of the abnormal indicator value together with the abnormal indicator value for each communication section, the indicator value pattern information generation unit 126 may generate indicator value pattern information indicating the abnormal indicator value detected for each communication section and the abnormal level of the abnormal indicator value.

Subsequently, the failure information providing unit 140 of the system 100 may provide information about whether failure occurred in the mobile communication network and the failure cause by comparing the current indicator value pattern of the mobile communication network detected by the indicator value pattern detection unit 120 with the learned indicator value pattern (S640 to S660).

Describing in detail, the failure occurrence detection unit 142 of the failure information providing unit 140 may compare the current indicator value pattern information generated by the indicator value pattern information generation unit 126 of the indicator value pattern detection unit 120 with the indicator value pattern information learned by the indicator value pattern learning unit 130 (S640), and when there is sameness (S650), may detect that failure occurred in the mobile communication network. In this case, the failure occurrence detection unit 142 may search for the corresponding indicator value pattern information that matches the current indicator value pattern information of the mobile communication network in the database 132 that stores the indicator value pattern information for each failure cause.

Subsequently, when it is detected that failure occurred in the mobile communication network, the failure information generation unit 144 of the failure information providing unit 140 may search for failure cause information corresponding to the current indicator value pattern of the mobile communication network in the database 132, generate failure information including the corresponding failure occurrence fact and the failure cause corresponding to the corresponding indicator value pattern, and output the generated failure information through the predetermined output unit (not shown) of the system 100 such as a display device, an audio device or a printer (S660). The failure information may be provided as visual information outputted through a display device or a printer or auditory information outputted through an audio device.

Subsequently, the system 100 may repeat the above-described processes until the corresponding failure monitoring time passes, or there is a monitoring completion command from the system operator (S670).

Meanwhile, the embodiments according to the present disclosure may be implemented in a computer system and computer programs that operate the computer system. When the embodiments of the present disclosure are implemented in computer programs, the elements of the present disclosure are program segments that perform the corresponding operation or step through the computer system. The computer programs or program segments may be stored in computer-readable recording media or transmitted in the form of a data signal combined with a carrier wave via a transmission medium or communication network. The computer-readable recording media includes any type of medium capable of recording data that can be read by the computer system. For example, the computer-readable recording media may include ROM, RAM, CD-ROM, magnetic tape, floppy disk and optical data storage. Additionally, the recording media may be distributed over computer systems connected via various networks to store or execute program codes in a distributed fashion.

As described above, according to the present disclosure, in a mobile communication network including section between a mobile communication terminal and a server, indicator values indicating the communication situation of the corresponding section are collected from many communication sections between each device that constitutes the mobile communication network to monitor the overall communication situation of the mobile communication network, thereby accurately and reliably detecting failures occurring by various causes in various sections of the mobile communication network in which many devices are organically connected and linked to each other. Additionally, considering all indicator values collected from many communication sections of the mobile communication network as an indicator value pattern indicating the communication situation of the mobile communication network, and an indicator value pattern when failure occurs is learned to provide the failure occurrence fact and failure cause information in real time when the same indicator value pattern appears in the mobile communication network later, thereby eliminating the failure quickly and guaranteeing the quality of a communication service. Furthermore, before failure monitoring, a threshold value for identifying if each indicator value is abnormal is calculated by applying a statistical method to indicator values collected for a predetermined period of time, and the indicator value pattern of the mobile communication network is detected or learned based on the threshold values, thereby adaptively responding to a gradual environmental change of the mobile communication network such as a change in the total amount of communication. Moreover, threshold value identifies if the indicator values are abnormal as well as how much abnormal the indicator value is, and the indicator value pattern of the mobile communication network is detected or learned based on the threshold values, resulting in further improved accuracy and reliability in failure detection and analysis. Further, it is obvious that the embodiments according to the present disclosure can also solve technical problems other than those mentioned in the corresponding technical field and the related technical field.

The present disclosure have been hereinabove described with reference to the specific embodiments. However, those skilled in the art will clearly understand that modifications and variations may be made to the embodiments within the technical scope of the present disclosure. Accordingly, the disclosed embodiments should be considered in an illustrative sense, not in a restrictive sense. That is, the true technical scope of the present disclosure is defined by the appended claims, and it should be interpreted that the present disclosure covers all differences in the equivalent scope.

What is claimed is:

1. A mobile communication network failure monitoring system, comprising:
one or more processors configured to:
collect a quantified indicator value about a predetermined indicator indicating a communication situation of a corresponding communication section for each communication section between each node that constitutes a mobile communication network;
detect an indicator value pattern of the mobile communication network using an abnormal indicator value determined by comparing with a threshold value among the indicator values collected for each communication section;
learn the indicator value pattern for each failure cause of the mobile communication network by storing the indicator value pattern of the mobile communication network detected when a failure occurs in the mobile communication network and a corresponding failure cause; and
provide information about whether a failure occurred in the mobile communication network and a failure cause by comparing the indicator value pattern of the mobile communication network detected for a predetermined failure monitoring time with the learned indicator value pattern.

2. The mobile communication network failure monitoring system according to claim 1, wherein the one or more processors are further configured to collect a signaling indicator value about predetermined signaling occurring in a corresponding communication section or a traffic indicator value about traffic occurring in the corresponding communication section.

3. The mobile communication network failure monitoring system according to claim 1, wherein the one or more processors are further configured to:
set an indicator indicating a communication situation of a corresponding communication section for each communication section;
receive indicator information about the indicator for each communication section; and
calculate an indicator value quantitatively indicating the communication situation of the corresponding communication section using the indicator information.

4. The mobile communication network failure monitoring system according to claim 1, wherein the one or more processors are further configured to:
calculate a threshold value indicating an abnormal indicator value range of the corresponding indicator using the indicator values of each indicator collected repeatedly for a predetermined period of time;
detect an abnormal indicator value for each communication section by comparing the indicator value of each indicator collected for a predetermined failure monitoring time with the threshold value of the corresponding indicator; and
generate indicator value pattern information of the mobile communication network using the abnormal indicator value detected for each communication section.

5. The mobile communication network failure monitoring system according to claim 4, wherein the one or more processors are further configured to calculate a plurality of threshold values indicating the abnormal indicator value range and an abnormal level of an indicator value corresponding to the abnormal indicator value range.

6. The mobile communication network failure monitoring system according to claim 5, wherein the one or more processors are further configured to detect the abnormal indicator value and the abnormal level of the abnormal indicator value for each communication section by comparing the indicator value of each indicator collected for the predetermined failure monitoring time with the plurality of threshold values.

7. The mobile communication network failure monitoring system according to claim 6, wherein the one or more processors are further configured to generate indicator value pattern information of the mobile communication network using the abnormal indicator value detected for each communication section and the abnormal level of the abnormal indicator value.

8. The mobile communication network failure monitoring system according to claim 4, wherein the one or more processors are further configured to generate alarm information about the abnormal indicator value detected for each communication section and output the same.

9. The mobile communication network failure monitoring system according to claim 1, wherein the one or more processors are further configured to match the indicator value pattern of the mobile communication network including the abnormal indicator value collected for each communication section when a failure occurs in the mobile communication network with a failure cause and store the same.

10. The mobile communication network failure monitoring system according to claim 1, wherein the one or more processors are further configured to:
compare the indicator value pattern of the mobile communication network detected for a predetermined failure monitoring time with the learned indicator value pattern, and when there is sameness, detects that a failure occurred in the mobile communication network; and
generate failure information including a corresponding failure occurrence fact and a failure cause corresponding to the indicator value pattern of the mobile communication network and output the same, when it is detected that the failure occurred in the mobile communication network.

11. A mobile communication network failure monitoring method for monitoring a failure in a mobile communication network using a mobile communication network failure monitoring system, comprising:
a per section indicator value collection step of collecting, by the system, quantified indicator values about a predetermined indicator indicating a communication situation of a corresponding communication section for each communication section between each node that constitutes the mobile communication network;

an indicator value pattern detection step of detecting, by the system, an indicator value pattern of the mobile communication network using an abnormal indicator value determined by comparing with a threshold value among the indicator values collected for each communication section;

an indicator value pattern learning step of learning, by the system, the indicator value pattern for each failure cause of the mobile communication network by storing the indicator value pattern of the mobile communication network detected when a failure occurs in the mobile communication network and a corresponding failure cause; and a failure information providing step of providing, by the system, information about whether a failure occurred in the mobile communication network and a failure cause by comparing the indicator value pattern of the mobile communication network detected for a predetermined failure monitoring time with the learned indicator value pattern.

12. The mobile communication network failure monitoring method according to claim 11, wherein the per section indicator value collection step comprises collecting a signaling indicator value about predetermined signaling occurring in a corresponding communication section or a traffic indicator value about traffic occurring in the corresponding communication section.

13. The mobile communication network failure monitoring method according to claim 11, wherein the per section indicator value collection step comprises:

an indicator setting step of setting, by the system, an indicator indicating a communication situation of a corresponding communication section for each communication section;

an indicator information receiving step of receiving, by the system, indicator information about the indicator for each communication section; and an indicator value calculation step of calculating, by the system, an indicator value quantitatively indicating the communication situation of the corresponding communication section using the indicator information.

14. The mobile communication network failure monitoring method according to claim 11, wherein the indicator value pattern detection step comprises:

a threshold value calculation step of calculating, by the system, a threshold value indicating an abnormal indicator value range of the corresponding indicator using the indicator values of each indicator collected repeatedly for a predetermined period of time;

an abnormal indicator value detection step of detecting, by the system, an abnormal indicator value for each communication section by comparing the indicator value of each indicator collected for a predetermined failure monitoring time with the threshold value of the corresponding indicator; and an indicator value pattern information generation step of generating, by the system, indicator value pattern information of the mobile communication network using the abnormal indicator value detected for each communication section.

15. The mobile communication network failure monitoring method according to claim 14, wherein the threshold value calculation step comprises calculating a plurality of threshold values indicating the abnormal indicator value range and an abnormal level of an indicator value corresponding to the abnormal indicator value range.

16. The mobile communication network failure monitoring method according to claim 15, wherein the abnormal indicator value detection step comprises detecting the abnormal indicator value and the abnormal level of the abnormal indicator value for each communication section by comparing the indicator value of each indicator collected for the predetermined failure monitoring time with the plurality of threshold values.

17. The mobile communication network failure monitoring method according to claim 16, wherein the indicator value pattern information generation step comprises generating indicator value pattern information of the mobile communication network using the abnormal indicator value detected for each communication section and the abnormal level of the abnormal indicator value.

18. The mobile communication network failure monitoring method according to claim 14, wherein the indicator value pattern detection step further comprises generating, by the system, alarm information about the abnormal indicator value detected for each communication section and outputting the same.

19. The mobile communication network failure monitoring method according to claim 11, wherein the indicator value pattern learning step comprises matching, by the system, the indicator value pattern of the mobile communication network including the abnormal indicator value collected for each communication section when a failure occurs in the mobile communication network with a failure cause of the system and storing the same.

20. The mobile communication network failure monitoring method according to claim 11, wherein the failure information providing step comprises:

the failure occurrence detection step of comparing, by the system, the indicator value pattern of the mobile communication network detected for a predetermined failure monitoring time with the learned indicator value pattern, and when there is sameness, detecting that a failure occurred in the mobile communication network; and the failure information generation step of generating, by the system, failure information including a corresponding failure occurrence fact and a failure cause corresponding to the indicator value pattern of the mobile communication network and outputting the same, when it is detected that the failure occurred in the mobile communication network.

21. A non-transitory computer readable medium configured to store instructions, the instructions configured to cause a computer system to perform monitoring a failure in a mobile communication network using a mobile communication network failure monitoring system by:

collecting, by the system, quantified indicator values about a predetermined indicator indicating a communication situation of a corresponding communication section for each communication section between each node that constitutes the mobile communication network;

detecting, by the system, an indicator value pattern of the mobile communication network using an abnormal indicator value determined by comparing with a threshold value among the indicator values collected for each communication section;

learning, by the system, the indicator value pattern for each failure cause of the mobile communication network by storing the indicator value pattern of the mobile communication network detected when a failure occurs in the mobile communication network and a corresponding failure cause; and providing, by the system, information about whether a failure occurred in the mobile communication network and a failure cause by comparing the indicator value pattern of the mobile communication network detected for a predetermined failure monitoring time with the learned indicator value pattern.

* * * * *